United States Patent [19]

Larsson

[11] Patent Number: 4,540,200

[45] Date of Patent: Sep. 10, 1985

[54] ROCK DRILL

[75] Inventor: Lars E. Larsson, Sandviken, Sweden

[73] Assignee: Santrade Ltd., Lucerne, Switzerland

[21] Appl. No.: 420,243

[22] PCT Filed: Jan. 26, 1982

[86] PCT No.: PCT/SE82/00021

§ 371 Date: Sep. 17, 1982

§ 102(e) Date: Sep. 17, 1982

[87] PCT Pub. No.: WO82/02735

PCT Pub. Date: Aug. 19, 1982

[30] Foreign Application Priority Data

Feb. 2, 1981 [SE] Sweden ............................. 8100767

[51] Int. Cl.³ ............................................. F16L 55/00
[52] U.S. Cl. .................................. 285/332.4; 175/57;
175/320
[58] Field of Search ............. 285/40, 333, 334, 332.4;
175/320, 57

[56] References Cited

U.S. PATENT DOCUMENTS

| | | |
|---|---|---|
| 91,291 | 6/1869 | Wegmann ............................. 285/40 |
| 635,636 | 10/1899 | Bailey ................................... 285/40 |
| 1,776,615 | 9/1930 | Boothman et al. .......... 285/332.4 X |
| 1,974,150 | 9/1934 | Creveling ......................... 285/40 X |
| 2,711,913 | 6/1955 | Jungblut . |
| 2,793,884 | 5/1957 | Jungblut ......................... 285/333 X |
| 2,872,226 | 2/1959 | Wright et al. . |
| 3,175,850 | 3/1965 | Steczynski .....:...................... 285/333 |
| 3,224,794 | 12/1965 | Crissy .................................... 285/40 |
| 3,272,539 | 9/1966 | Asbury, Sr. ...................... 285/332.4 |
| 3,508,773 | 4/1970 | Coberly et al. . |
| 3,519,090 | 7/1970 | Herring ............................... 175/320 |
| 4,298,221 | 11/1981 | McGugan ................... 285/332.4 X |

Primary Examiner—Thomas F. Callaghan
Attorney, Agent, or Firm—Burns, Doane, Swecker & Mathis

[57] ABSTRACT

A drilling assembly for use in percussion drilling comprising a drill bit and a drill rod having cooperating conical surfaces, one of said surfaces being provided with a helically extending thread. For purposes of ensuring a reliable connection the thread meets certain geometrical demands and is designed as a left hand thread. Further, the conical surface being provided with the thread is harder than the other conical surface.

13 Claims, 3 Drawing Figures

ROCK DRILL

The present invention relates to a rock drill and more precisely to a drilling assembly for use in percussion rock drilling comprising a drill bit having a first conical surface and adapted for connection to a drill rod having a corresponding second conical surface.

In percussion rock drilling either integral drill steels or detachable drill bits are used. Such drill bits are, during drilling, connected to a drill rod by means of a threaded connection or conical frictional connection.

The disadvantage of the conical connections is primarily that, during certain circumstances, there is a risk that the drill bit is lost, and that the drill rod sometimes has a tendency to slip or spin in the drill bit. Loss of the drill bit may happen if a firm frictional connection is not yet created which means that the drill bit may be dislodged by appearing shock wave forces. Slip of the drill rod, or spinning thereof in a non-rotating drill bit may be caused if the drill bit enters a cavity in the rock, which means that the shock waves are not transmitted to the rock but instead do loosen the firm connection between drill bit and drill rod.

The object of the present invention is to provide a drilling assembly having a conical frictional connection which does not have the above disadvantage.

This and other objects of the invention have been attained by giving the invention the characterizing features stated in the appending claims. The invention is described in the following with reference to the accompanying drawings in which one embodiment is shown by way of example. It is to be understood that this embodiment is only illustrative of the invention and that various modifications may be made within the scope of the claims.

Figure 1:
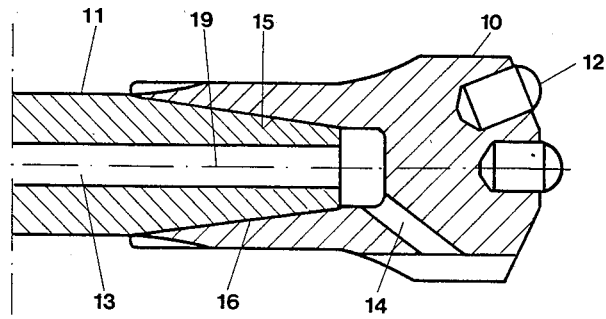
FIG. 1 shows a drilling assembly according to the invention.

The drilling assembly according to the invention comprises a percussion drill bit 10, which is intended to be connected to a drill rod 11. The drill bit 10 is in conventional manner provided with a plurality of hard metal inserts 12. During drilling flushing medium is supplied to the bottom of the drill hole through a passage 13 in the drill rod and one or several branching passages 14 in the drill bit.

The drill bit 10 is provided with a conical surface 15 and the drill rod 11 has a corresponding conical surface 16. For purposes of obtaining a more reliable connection between the drill bit 10 and the drill rod 11 the conical surface 16 is provided with a helical thread 17.

In the preferred embodiment the thread 17 is made by means of a turning tool. The radius of curvature r of the profile of the thread, thus, coincides with the radius of the indexable insert of the turning tool. Preferably, the radius of curvature r is constant and has a value within the interval 0.5 mm to 2.0 mm, with preference for values somewhat smaller than 1.0 mm.

The conical surface 15 of the drill bit 10 is smooth, i.e. unthreaded, before the connection of the drill bit to the drill rod 11. During the connection, thus, contact first arises at the crests of the thread 17, see FIG. 2. During drilling, then, the thread 17 will impress a corresponding thread in the drill bit by means of the shock wave forces from the rock drilling machine. Thus, a miniature-thread connection is obtained which together with the tapered embodiment ensures a safe and reliable attachment of the drill bit to the drill rod. It has been found that in a drilling assembly according to a preferred embodiment of the present invention a substantially conversely congruent thread is impressed in the drill bit 10. In order to ensure such impression it has been found that the conical surface 16 shall be harder than the conical surface 15, preferably at least 10 Rockwell "C" units ($H_{RC}$) harder. Such a difference in hardness also means that the drill bit 10 can be replaced by a new drill bit on the same drill rod when becoming worn, since the conical surface 16 on the whole is intact, which affects the drilling costs favorably.

According to the invention the thread 17 is further a left hand thread which means that, due to the rotational direction of the usual rock drilling machines, the pitch direction of the thread 17 is such that the drill bit during drilling has a tendency to be drawn even more tightly on the conical surface 16.

Figure 2:
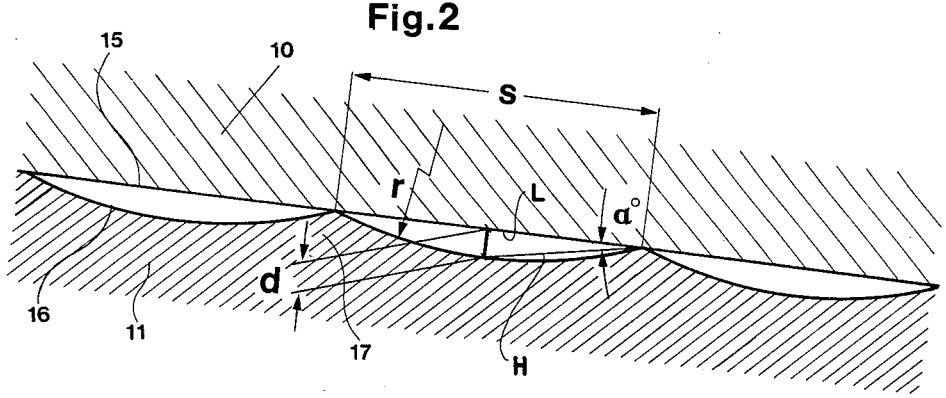
FIG. 2 shows on an enlarged scale the cooperating conical surfaces in the position when contact first arises during the connection of the drill bit and drill rod.
Figure 3:
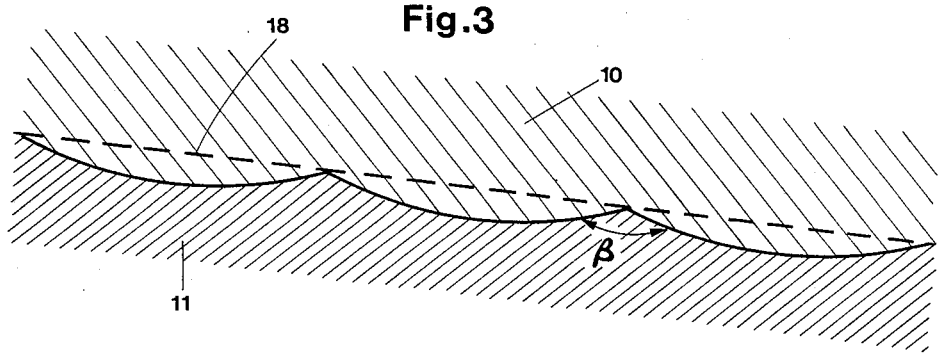
FIG. 3 shows the conical surfaces in FIG. 2 in their final connected position.

Further, according to the invention, the depth d of the thread 17 is larger than the smaller leg in a right-angled triangle in which the large leg L coincides with the generatrix 18 of the conical surfaces, the hypotenuse H is parallel with the longitudinal axis 19 of the drilling assembly and the smallest angle $\alpha$ is formed between the generatrix 18 and the hypotenuse. The angle $\alpha$, thus, is half of the included taper angle. In FIG. 2 is shown the lower limit value of the depth d in order to meet the geometrical demands which are required for ensuring that the drill bit 10 will not be dislodged from the drill rod 11 by means of the shock wave forces.

In the preferred embodiment the thread 17 forms with the generatrix 18 a segment having a chord S and a height d; the curved portion of the segment coinciding with the radius r of the cutting insert of the turning tool. The height d is also the small leg in a right-angled triangle, the large leg of which being half the chord (s/2) and the top angle of which coinciding with the half cone angle $\alpha$ of the conical surfaces. According to the invention, thus, the height d of the removed segment shall be larger than, or at least equal to, the height d of the right-angled triangle.

The lower limit value is obtained by equalizing the height of the segment, $r-(\sqrt{4r^2-s^2})/2$, and the small leg in the triangle, $tg\alpha \times s/2$.

It is also to be found that if the radius of curvature r is 0.8 mm and the cone angle $\alpha$ is 6° then the pitch s of the miniature thread shall exceed 0.3326 mm.

By tests it has been found that a reliable conical connection is obtained only if all the three conditions stated below are fulfilled, namely that (1) the miniature thread is a left hand thread,
(2) the depth of the miniature thread exceeds a lower limit value, and
(3) the conical surface being provided with the thread is harder than the other conical surface.

It has also been found that the depth d of the thread should not be too large, because too large a depth will result in the drill bit 10 becoming difficult to loosen due to the fact that the portions thereof between the crests of the thread 17 partly have to be cut off during the disconnection. If the depth d of the thread is smaller than 3.0 mm, then probably this disadvantage is eliminated. It has been found that values smaller than 2.0 mm are to be preferred, with preference for values smaller than 0.5 mm.

In the preferred embodiment the angle β between two adjacent flank surfaces at the crest of the thread 17 is obtuse.

I claim:

1. In a percussion rock drilling assembly of the type comprising:
    a drill bit mounted on a drill rod such that a first conical surface on said drill bit engages a second conical surface on said drill rod, the improvement wherein:
        one of said first and second conical surfaces is harder than the other and includes a helically extending left-hand thread, and
        said other conical surface is generally smooth and sized to receive said one surface by a frictonal sliding fit so that a corresponding helical thread is formed in said other surface in response to shock waves generated during a percussion drilling operation.

2. A drilling assembly according to claim 1, wherein the depth of said thread is at least as long as the small leg in a right-angled triangle, the large leg of which triangle coinciding with a generatrix of said conical surfaces, the hypotenuse of which being parallel with a longitudinal axis of the drilling assembly, and the smallest angle of which being formed between the generatrix and the hypotenuse, said triangle being inscribed within the profile of the thread.

3. A drilling assembly according to claim 1, wherein the profile of the thread along at least a fraction of its axial extent is continuously curved, preferably at least along the bottom portions thereof.

4. A drilling assembly according to claim 3, wherein the radius of curvature of the thread profile is constant and has a value within the interval 0.5 mm to 2.0 mm.

5. A drilling assembly according to claim 4, wherein said value is below 1.0 mm.

6. A drilling assembly according to claim 1, wherein the pitch of the thread is larger than 0.2 mm.

7. A drilling assembly according to claim 6, wherein said pitch is larger than 0.3 mm.

8. A drilling assembly according to claim 2, wherein said depth is smaller than 0.5 mm.

9. A drilling assembly according to claim 1, wherein said one conical surface is at least 10 Rockwell "C" units harder than said other conical surface.

10. A drilling assembly according to claim 1, wherein said second conical surface constitutes said one conical surface.

11. A drill rod for carrying a drill bit in a percussion rock drilling assembly, said drill rod having a first conical surface adapted to be frictionally slidingly received in a second smooth conical surface of the drill bit, said drill rod including a helically extending left-hand thread, the depth of said thread being at least equal to the small leg of a right triangle having a large leg coinciding with a generatrix of said conical surfaces, a hypotenuse parallel to a longitudinal axis of said drill rod, and a smallest angle formed by the generatrix and hypotenuse, the triangle being inscribed within the profile of the thread.

12. A drill rod according to claim 11, wherein the depth of said thread is less than 0.5 mm.

13. A method of forming a threaded connection between a drill bit member and a drill rod member of a percussion rock drilling assembly, comprising the steps of:
    providing one of said members with a first conical surface having a first helically extending left-hand thread,
    joining said one member with the other of said members such that said first surface engages a generally smooth second conical surface of said other member and which second surface is softer than said first surface, and
    performing a percussion drilling operation so that the generated shock waves form in said second surface a second helical thread which corresponds to said first thread.

* * * * *